(12) United States Patent
Mann

(10) Patent No.: US 11,472,505 B2
(45) Date of Patent: Oct. 18, 2022

(54) METHOD OF MOUNTING STORAGE UNITS ON A MOTORCYCLE

(71) Applicant: James W. Mann, Elkton, MD (US)

(72) Inventor: James W. Mann, Elkton, MD (US)

( * ) Notice: Subject to any disclaimer, the term of this patent is extended or adjusted under 35 U.S.C. 154(b) by 148 days.

(21) Appl. No.: 17/078,220

(22) Filed: Oct. 23, 2020

(65) Prior Publication Data

US 2021/0039736 A1    Feb. 11, 2021

Related U.S. Application Data

(62) Division of application No. 13/998,911, filed on Dec. 20, 2013, now Pat. No. 10,858,056.

(51) Int. Cl.
*B62J 7/08*   (2006.01)
*B62J 9/23*   (2020.01)
*B62J 25/06*  (2020.01)

(52) U.S. Cl.
CPC . *B62J 7/08* (2013.01); *B62J 9/23* (2020.02); *B62J 25/06* (2020.02); *Y10T 29/49826* (2015.01)

(58) Field of Classification Search
CPC ...... B62J 7/08; B62J 9/23; B62J 25/06; Y10T 29/49826
See application file for complete search history.

(56) References Cited

U.S. PATENT DOCUMENTS

| 6,053,384 A | 4/2000 | Bachman |
| 6,131,427 A | 10/2000 | Webber |
| 2007/0062327 A1 | 3/2007 | Kouchi |

*Primary Examiner* — Derek J Battisti
(74) *Attorney, Agent, or Firm* — Miller Law Group, PLLC

(57) ABSTRACT

A method of mounting a storage unit to a vehicular apparatus, such as a motorcycle, includes the step of securing a cantilevered mounting member having a mounting plate to the frame of the vehicular apparatus. A storage device can be connected to the mounting plate to stabilize the storage device as the vehicular apparatus is in motion. As a preferred embodiment, the method of mounting begins with the removal of a foot peg from a motorcycle to expose the foot peg mounting bracket to which the mounting member is affixed. The mounting plate of the mounting member can be used to secure articles to be transported by the vehicular apparatus with or without a separate storage device.

14 Claims, 6 Drawing Sheets

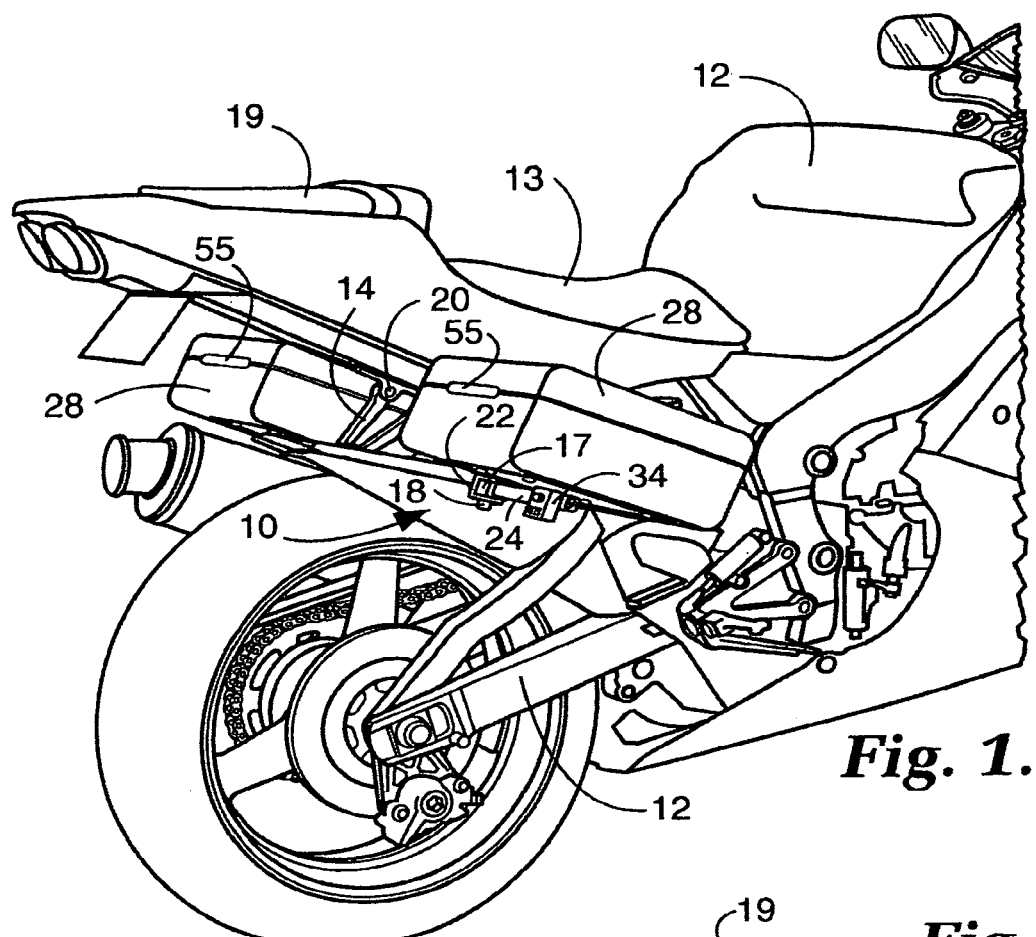
*Fig. 1.*
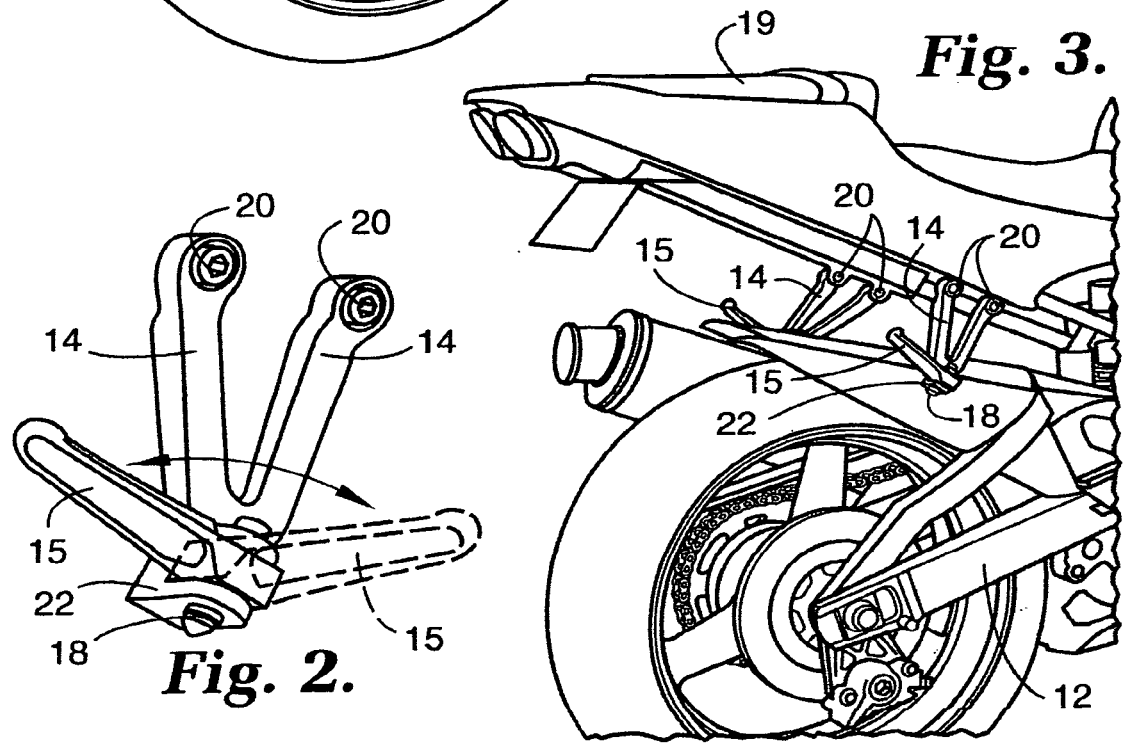
*Fig. 2.*
*Fig. 3.*

METHOD OF MOUNTING STORAGE UNITS ON A MOTORCYCLE

CROSS-REFERENCE TO RELATED APPLICATIONS

This application is a divisional application of U.S. application Ser. No. 13/998,911, filed on Dec. 20, 2013, which is a divisional application of U.S. application Ser. No. 12/070,197, filed Feb. 15, 2008, the contents of which are incorporated herein by reference.

FIELD OF THE INVENTION

The present invention relates generally to device attachable to apparatus, such as motorcycles, all-terrain vehicles, bicycles, and the like, and, more particularly, to a method of mounting devices to the frame of the apparatus in order to provide a storage unit for carrying material on such apparatus.

BACKGROUND OF THE INVENTION

Devices for affixing storage containers and luggage to motorcycles, which inherently limit available options, currently are many in number and varied in design and capacity. Most date back to the saddlebags used long ago to carry various items and consisting of two bags connected together and being draped over the back end of one's horse and cinched thereto. Several forms of motorcycle "saddlebags" are described in U.S. Pat. No. 6,053,384, discussed more fully below.

Among the multitude of designs for luggage carriers for motorcycles and the like, the luggage usually is available in one of two varieties, hard or soft. Soft luggage is usually made from some form of fabric, frequently ballistic nylon or similar durable and flexible material. This luggage usually mounts to the vehicle with straps, tie downs or other securing devices.

It has the benefits of being light and conformable. One drawback in a mounting system that uses a number of straps or tie downs is that installation and removal can be time consuming. The luggage or mounting straps, buckles, etc., frequently contact the vehicle, which can result in damage to the vehicle. Soft luggage also typically uses zippers or the like for closures, making them difficult to securely lock. Similarly, the use of straps and tie downs makes the luggage difficult to affix securely to the vehicle.

Alternatively, hard luggage is usually made of fiberglass, plastic, metal, thick leather, or some other rigid material. Hard luggage has a benefit of being more easily designed to ensure waterproofness, and it can be mounted such that it does not contact the vehicle. It is also easier to incorporate secure locking mechanisms for the luggage and to lock the luggage to the vehicle. Hard luggage has a drawback of being heavier than soft, and requires a more sophisticated mounting system in order to accommodate the increased weight and the lack of flexibility or conformability inherent in the luggage material. These mounting systems can be quite large, and are typically permanently attached and not easily removed from the vehicle or the luggage.

Among the several issued patents directed to luggage carriers for vehicles, especially motorcycles, exemplary is U.S. Pat. No. 6,053,384. The reference discloses a system for removably mounting a saddle bag on the fender strut of a motorcycle. A mounting assembly includes a front and rear mounting bracket attached to an inboard face of the bag by a rigid backing plate. Two cylindrical spool-like keepers are retrofitted to attach to the existing fender and bag guard mounting points on a fender strut. Existing mounting bolts are replaced with longer replacement bolts. A slot in each bracket is sized to slidably engage the neck and heads of each keeper. The bag and bracket assembly are secured to the keepers by a mounting screw.

A foot peg/lock holder combination for a motorcycle is disclosed in U.S. Pat. No. 6,131,427. The reference describes a multi-purpose foot rest peg having an elongated groove to accommodate a disc rotor brake lock, with a hole to accommodate the cylinder locking apparatus of an existing U-shaped rotor disc lock attached to a motorcycle as a foot rest. This allows the lock to combine with the foot rest peg clevis to create a foot rest/rotor disc lock holder combination for a motorcycle.

More recently, Patent Publication US2007/0062327A1 discloses a passenger footrest structure which includes a footrest support bracket for supporting a passenger footrest and an accessory mount formed therewith for supporting an accessory part other than the footrest. The publication describes passenger foot pegs, employed on a motorcycle for the support of feet of a passenger occupying the passenger's seat behind the driver, as generally rigidly secured to a motorcycle frame structure through respective footrest support brackets. Footrest support brackets are employed on each side of the motorcycle frame structure. Prior art footrest structures are said to be exclusively designed to support the respective feet of the fellow passenger and are not designed for any other purpose than for the support of the fellow passenger's feet. The reference then describes a motorcycle passenger footrest structure capable of accommodating, selectively, one of various motorcycle accessory parts such as a grip bar, a stay for the support of a pannier case, a helmet holder, a rope anchor, and any other component part employed in association with the motorcycle.

This reference discloses and suggests an additional mount to be added to the conventional passenger foot peg bracket of a motorcycle to support the various accessories described therein.

In contrast to the known prior disclosures, the present invention provides an improved mounting system for mounting storage units to vehicles such as motorcycles, ATVs, bicycles, and the like, wherein the mounting system fixedly maintains the spatial orientation between the storage units and the vehicle. The storage units can be removably locked to the vehicle and the storage system and/or the storage units can be quickly and easily removed and/or reinstalled on the vehicle. The storage unit as described and claimed herein is intended to encompass containers and receptacles and other variations for storing and transporting such as straps, nets, clamps, and the like.

SUMMARY OF THE INVENTION

It is an object of this invention to overcome the disadvantages of the prior art by providing a method of mounting a storage unit on a motorcycle.

A method of mounting a storage unit to a vehicle is provided. The method of mounting utilizes a single, cantilevered support member removably and non-rotationally attached at the proximal end of the support member to the vehicle. The distal end of the support member is formed with a receiving member having a mounting device to which a separate storage device can be detachably connected to the receiving member. The vehicle may be a motor vehicle such as a motorcycle, an all-terrain-vehicle (ATV), or other similar vehicle, including a bicycle.

A first disclosed method for removably affixing the single cantilevered support member to a motorcycle preferably includes a mounting block removably affixed to the motorcycle to which mounting block the support member is affixed. A receiving member having a tube affixed thereto can receive the support member, which is preferably locked thereto. A storage device can be detached to the receiving member with standard fasteners.

The storage device may be constructed of a soft material such as leather or nylon, or a hard material such as a plastic, for example an ABS plastic, fiberglass, or a metal such as aluminum or steel.

In use with a motorcycle, the support member preferably is removably attachable at the proximal end to the clevis of the conventional passenger foot peg bracket of the motorcycle. The support member may be locked to the clevis by a suitable locking device having a locking pin, wherein the locking pin anchors the support member and passes through existing openings in the clevis. The lock may be a key lock or a combination lock. In this preferred embodiment, the proximal end of the support member is rectangular or square in cross-section and fits into the clevis snugly, thereby rendering the support member non-rotational.

Mounting the storage unit to the receiver can be accomplished by using standard fasteners, or by an adhesive, such as a pressure sensitive adhesive film or a layer of a liquid epoxy adhesive, or by both. Preferably, mounting uses a combination of a plurality of fasteners and a suitable adhesive.

In an alternative embodiment, the apparatus attached to a motorcycle includes a cantilevered elongate support member insertable into an opening in and through the receiving member into which the support member is slidably and snugly received. In this configuration, the support member and the opening are both complimentary in cross-section such that, upon insertion of the support member into the opening, the apparatus is rendered non-rotational.

For an example, the receiving member may be a base plate affixed to a square tube into which the elongate support member having a square cross-section is received, the storage container being attachable to the base plate. The elongate support member and receiving member may be lockable, one to the other and, particularly, the support member and receiving member may be lockable by a lock securable by a locking pin, which pin, upon insertion of the elongate support member into the opening, extends through pre-bored openings in register in the square tube and the support member.

The storage container or device is preferably independently lockable. In one such embodiment, a threaded thumb screw is provided, extensible from the interior of the storage container through a wall of the container, through the receiving member, and extending into a threaded and tapped opening in the elongate support member with the container being independently lockable, thereby providing, upon assembly of the entire apparatus, a secure storage containment accessible only by unlocking the lockable storage container.

In a further embodiment, the method of mounting the support member includes the use of a mounting block removably secured into the clevis of a foot peg bracket of a motorcycle. The support member is also detachably mounted to the receiving member by a second lock and locking pin. The second locking pin can have a generally square cross-section and is snugly insertable into and through square openings in the receiving member and the mounting block. Alignment pins may be included extending from openings in the receiving member into openings in the mounting block, whereby rotation between receiver and block is prevented.

In a still further embodiment, the storage container or device can be mounted to the vehicular apparatus through a swivel mount.

In one embodiment, the support member and the receiving member may be constructed as separate sections and then affixed together to form a composite structure, such as a configuration wherein the separate sections are metal, are preformed and are affixed together by welding, brazing, or soldering. Alternatively, the support member and the receiving member may be constructed as a single unitary structure. In these constructions, a plastic such as a fiber reinforced or filled plastic, particularly a fiber reinforced ABS plastic, or a metal such as a molded, machined or cast metal such as aluminum or steel, are preferred materials.

These and other objects, features and advantages are accomplished according to the instant invention by providing a method of mounting a storage unit to a vehicular apparatus, such as a motorcycle, that includes the step of securing a cantilevered mounting member having a mounting plate to the frame of the vehicular apparatus. A storage device can be connected to the mounting plate to stabilize the storage device as the vehicular apparatus is in motion. As a preferred embodiment, the method of mounting begins with the removal of a foot peg from a motorcycle to expose the foot peg mounting bracket to which the mounting member is affixed. The mounting plate of the mounting member can be used to secure articles to be transported by the vehicular apparatus with or without a separate storage device.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

FIG. 1 is a perspective view of a complimentary pair of the assembled mounting apparatus of the invention on which storage containers are respectively affixed, all mounted on foot peg brackets of a motorcycle;

FIG. 2 depicts a conventional foot peg and foot peg bracket for a standard motorcycle, wherein the retracted position of the foot peg is shown and the outwardly extending foot rest position is shown in phantom, the convertability of the mechanism indicated by the double-headed arrow;

FIG. 3 shows a conventional motorcycle on which passenger foot rest pegs are mounted to foot peg brackets, the pegs being in the retracted position in the illustration;

DETAILED DESCRIPTION OF THE PREFERRED EMBODIMENT

Figure 4:
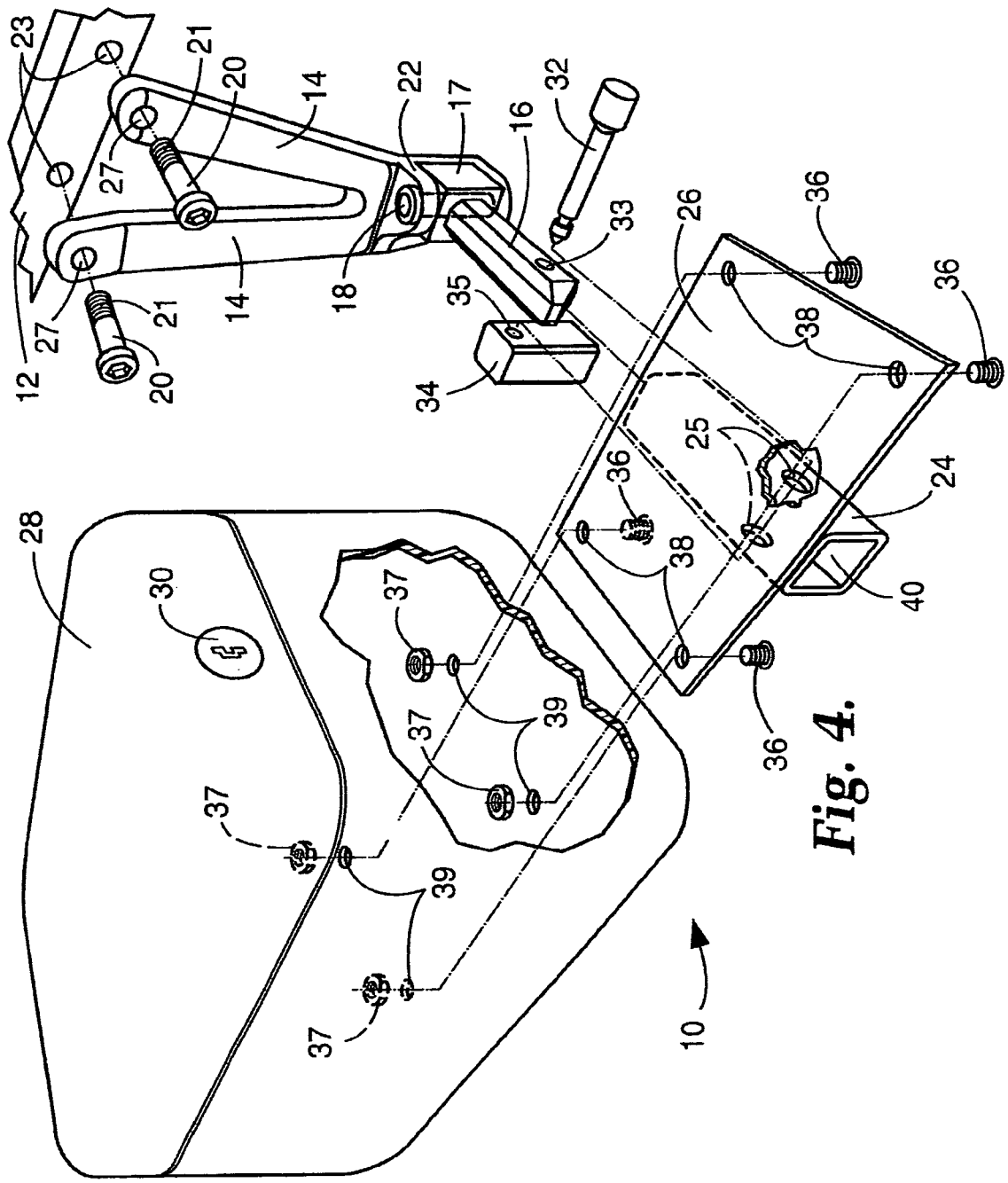
FIGS. 4 and 5 depict exploded views, partially broken away, of alternate, preferred embodiments of the storage unit mounting apparatus according to the invention.

Referring to the drawings, a storage unit mounting apparatus removably and lockably attachable to a vehicle, such as a motorcycle, and a method of mounting storage units on a vehicular apparatus, such as a motorcycle, is provided. The apparatus includes a single, cantilevered support member removably and non-rotationally attachable at the proximal end to the vehicle, the distal end of the support member supporting a receiver having integral mounting apparatus to which the storage container is attachable. The mounting apparatus is especially suited for vehicles such as motorcycles, all-terrain-vehicles (ATVs), bicycles and the like.

As best seen in FIG. 1, a pair of storage containers 28 are independently mounted upon corresponding passenger foot peg brackets 14 of a motorcycle 12. Each of the containers 28 is affixed to the motorcycle 12 by the mounting apparatus 10, to be described below in detail. For purposes of illustration, the container mounting apparatus 10 is shown in the drawings as being mounted on a motorcycle, but the mounting apparatus and method of mounting storage containers 28 can also be utilized on various vehicles, such as motorcycles, all-terrain-vehicles (ATVs), bicycles, and the like. Reference will be made herein to a motorcycle for ease of illustration.

The motorcycle and various conventional parts thereof will be referred to herein generally by the reference numeral "12", except where otherwise specifically noted, such as the driver's seat 13, the passenger's seat 19, and the passenger foot peg bracket 14. Component parts of the apparatus 10 shown in FIG. 1 include the storage containers or luggage 28, having lid hinges 55, shown mounted on cantilevered support members 17 affixed, at their proximal ends, to the clevis 22 of the foot peg brackets 14, and held in place by clevis pins 18. The entire container 28 and mounting system 10 is secured to the motorcycle by lock 34.

It will be clear to one skilled in the art that one storage system 10 may be employed, if desired, and affixed to either the right or left side of the cycle 12. A pair of storage containers 28 on opposing sides of the motorcycle 12 is preferred, as is shown in FIG. 1 for purposes of illustration.

The storage containers 28, or luggage, may be of any of the known conventional types, but hard luggage is preferred, which can be constructed of fiberglass, plastic, metal, thick leather, or other rigid material known in the art. The advantage of hard storage containers 28 is that these containers 28 are more easily made waterproof and can incorporate container locks readily as well as mechanisms for locking the container 28 to the vehicle 12.

For reference purposes, FIG. 2 shows a conventional passenger foot peg bracket used on a typical motorcycle, including "V"-shaped arms 14, connecting bolts 20 for affixing the bracket to the motorcycle frame 12 (not shown), the arms 14 converging at the clevis 22, in which is secured the foot peg 15 by clevis pin 18. The foot peg 15 is shown in a retracted position, with an operational position, extending outwardly to receive the foot of a passenger, illustrated in phantom, with the double-headed arrow indicating the movement thereof. This foot peg bracket, simply cited hereinafter as bracket 14, provides the connecting point to the motorcycle 12 for the storage container mounting apparatus 10 of the invention, upon removal of the foot peg 15, which in turn can be retained within container 28 for safekeeping.

FIG. 3 shows a further illustration of the conventional passenger foot pegs 15, a pair thereof, one each mounted on either side of motorcycle 12 in the devises 22 of the brackets 14, secured thereat by bolts 20, and positioned below passenger seat 19. In FIG. 3, the foot pegs 15 are shown in the retracted position.

FIG. 4 illustrates a preferred embodiment according to the invention. FIG. 4 is an exploded view, partially broken away, of a storage container 28 mountable upon mounting plate 26 as shown, by bolts 36 and nuts 37, which plate 26 is attached to square tube 24 having longitudinal opening 40 therethrough. Pre-bored openings 25 in the side walls of tube 24 accept locking pin 32 therethrough, described more fully below. Together the plate 26 defines an enlarged head and with the attached tube 24 forms the receiving member, or receiver, of the invention, which receives the elongate, cantilevered support member 16 which is affixed to a mounting block 17 inserted into clevis 22 of the foot peg bracket 14 and secured thereat by clevis pin 18.

The elongate member 16 has a cross-section, as shown, which, on insertion into the receiver tube 24, prevents spatial rotation of the mounting apparatus. The cross-section of member 16 may be square and can be chamfered at the leading distal end to allow for ready insertion into opening 40 of the sleeve-like receiver tube 24.

Both the cantilevered support member 16,17 and the receiver 24,26 may be constructed of any suitable, strong material, which will be known to the skilled artisan. For example, as discussed above, they may be of a suitable strong plastic such as an ABS plastic, or they may be of a metal, with aluminum being preferred owing to considerations of weight. The components may be fashioned by known techniques such as by molding, casting, or machining, all techniques known in the art and selected based on the material chosen for a particular vehicle mount.

The cross-section and other design features of support member 16 are also a matter of designer's choice. They will be chosen specifically to prohibit spatial rotation of the mount, and will include, in addition to substantially square cross-sections, dovetails, T-slotted shafts, and non-circular shafts in general.

In FIG. 4, the cantilevered member 16 has an opening 33 drilled therethrough to accommodate the locking pin 32 and associated lock 34, preferably a key lock, as shown. Foot peg bracket 14 is affixed to the vehicle 12, depicted as the motorcycle of FIG. 1, by bolts 20 extending through openings 27 and threaded to the frame 12 into tapped openings 23 having threads 21.

Upon assembly of the apparatus shown, and locking of lock 34 and independent container lock 30, the contents of container 28 are secure. In this arrangement, the container 28 and the attached receiver 24,26 can be easily detached from the vehicle simply by unlocking lock 34.

The vertical opening in support member 17 for clevis pin 18 is located such that, upon removal of clevis pin 18 the support member 16,17 may be removed, rotated 90 degrees and clevis pin 18 re-inserted. In this configuration, the support member 16,17 is positioned such that it no longer protrudes, but is still readily available for use. Furthermore, when the storage container mount is not needed, the support member 16,17 may be easily removed by opening clevis pin 18, removing the support apparatus and, if desired, replacing the foot peg 15 in the clevis 22 and reinserting the clevis pin 18.

Figure 5:
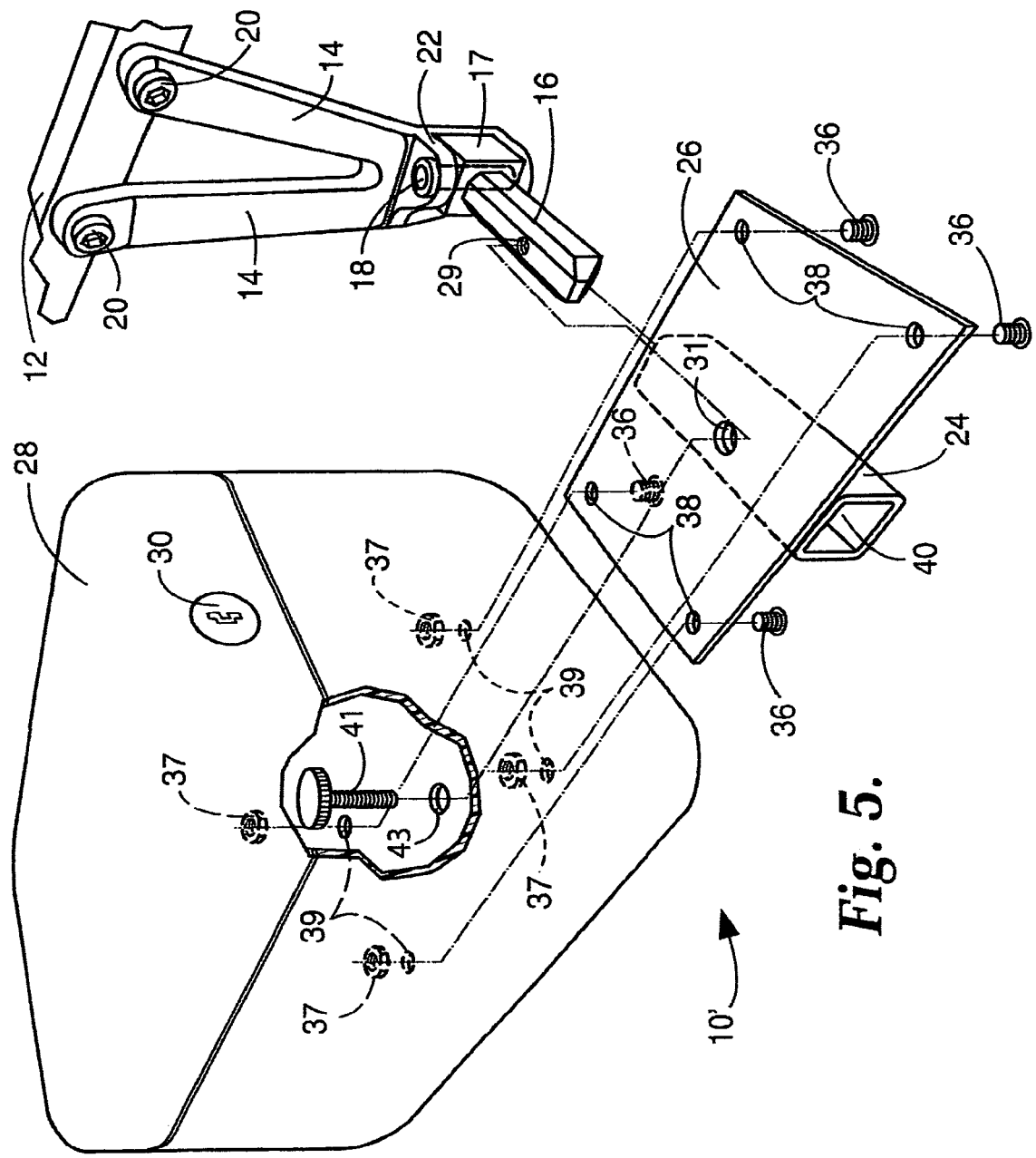

FIG. 5 illustrates a further preferred embodiment of the invention, and is similar in construction to the embodiment shown in FIG. 4. Like components in the two embodiments will be readily apparent to one skilled in the art and their descriptions will not be repeated, reference to the above description of FIG. 4 being incorporated by reference. An advantage to the system of FIG. 5 is presented by the single lock 30 in the lid of container 28, i.e., when the system is assembled and locked by container lock 30 the entire system is secured.

Referring to FIG. 5, the container 28 is affixed to receiving member 24,26 which accepts the cantilevered support 16, having mounting block 17, into the opening 40, in turn secured to the foot peg bracket 14 at clevis 22 by pin 18 and mounted to vehicle 12, all in a fashion similar to that of FIG. 4. In this embodiment, a threaded screw 41, such as the thumb screw 41 shown in the broken away view of FIG. 5, extends through the opening 43 in the bottom wall of container 28, through the pre-bored opening 31 in the top wall of square sleeve 24 and into the drilled and tapped opening 29 in elongate support member 16, openings 29 and 31 being in registry on assembly of the apparatus. In the embodiment shown, on assembly as shown, articles may be placed in container 28 in the open configuration, thumb screw 41 tightened by threaded engagement into opening 29 in support 16, and the entire system locked and secured in place simply by locking the container lock 30. In addition, the container/receiver assembly is easily detached and transportable simply by unscrewing the thumb screw after unlocking and opening container 28.

FIGS. 6-9 depict still further alternate embodiments of the storage container mounting apparatus of the invention. In these descriptions, like components will be described only once, reference to be had to these descriptions in their entireties.

Figure 6:
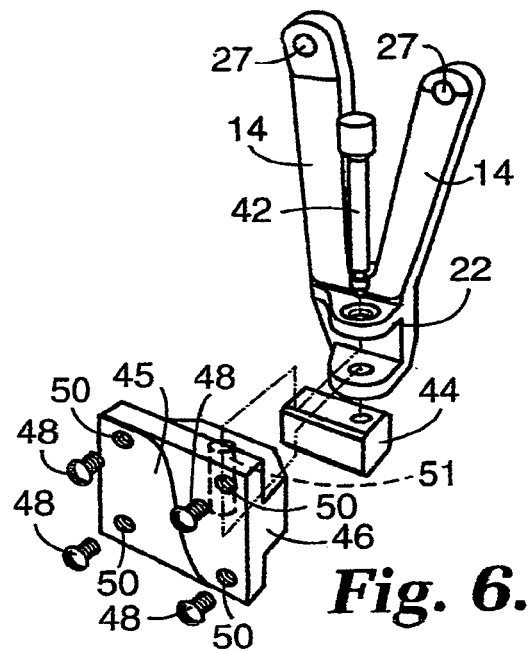

FIG. 6 depicts an exploded view of the apparatus of the invention in the most general form. Therein is shown the storage unit mounting apparatus wherein the support member and receiving member are constructed as a unitary component structure 46 having a proximal section as shown which is removably and non-rotationally attachable within the clevis 22 of the foot peg bracket 14 of a motorcycle 12. The component 46 is secured by lock 44, preferably a key lock, and lock pin 42, which also serves as a clevis pin passing through opening 51 on support 46 and thereby securing the apparatus to the bracket 14. The cantilevered distal section of member 46 defines an enlarged hear and acts as the receiving member which receives, removably, a storage container mounted thereto by bolts 48 affixed within threaded openings 50 in the unitary structure 46. The adhesive layer 45 is also shown in FIG. 6, and this is an optional manner in which the storage container can be secured to the receiving end of member 46.

Figure 7:
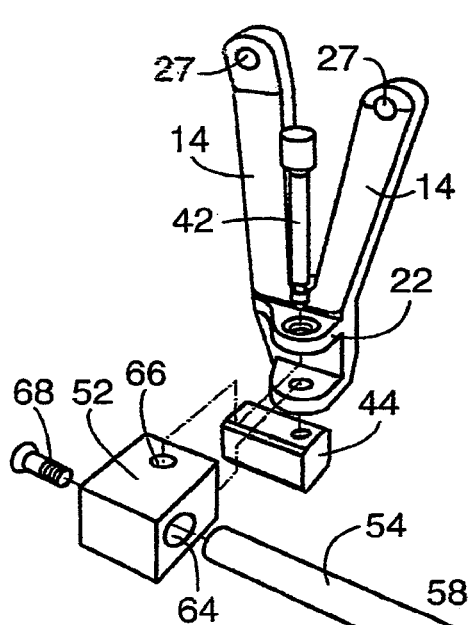
FIGS. 6-9 show further alternate embodiments of the storage container mounting apparatus according to the invention for mounting on the foot peg bracket of a motorcycle.

FIG. 7 shows an embodiment of the apparatus which includes an elongate cantilevered support shaft 54 affixed to mounting block 52 having opening 64 therethrough which accepts the cylindrical shaft 54 therein and is secured therein by threaded bolt 68 as shown. The block 52, a rectangular parallelepiped in shape, fits slidingly and snugly into the clevis 22 of foot peg bracket 14 and is lockable therein by lock 44 and lock pin 42, which also acts as the clevis pin, passing through the openings in clevis 22 and opening 66 in block 52. Owing to the rectangular shape, block 52 renders the mounting apparatus non-rotational.

The receiving member 47 receives the support shaft 54 through opening 62, the shaft 54 also being a lock pin acting cooperatively with lock 60 to removably lock the apparatus in place. The dual locking system, 44,60, presents alternate and evident locking options for the user. The storage container 28 is affixed to the receiver 47 by bolts 56 secured in threaded openings 58 in the receiver 47, with the optional adhesive layer 45 shown for completeness. This embodiment, in effect, provides a double-cantilevered support apparatus for container 28. The proximal face of the receiver 47 has the vertical indent indicated, which mates with block 52 on assembly, the assembly effectively preventing spatial rotation of the receiver 47.

Figure 8:
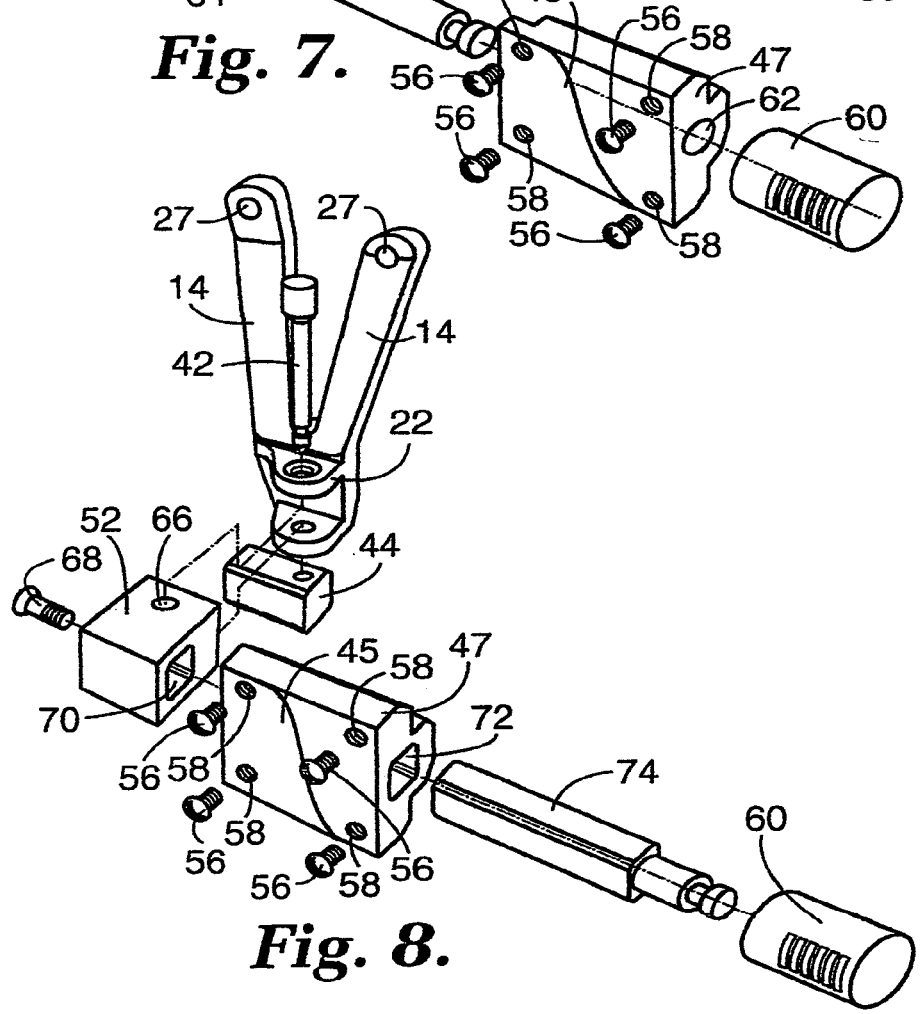

FIG. 8 depicts a variation on the embodiment of FIG. 7. The support shaft 74 in FIG. 8 has a square cross-section, which is attained by either machining or adding a sleeve, this shaft fitting slidably and snugly into and through square opening 72 within receiving member 47 and into square opening 70 in mounting block 52, secured thereat by threaded screw 68, the apparatus all being thereby rendered non-rotational upon assembly.

Figure 9:
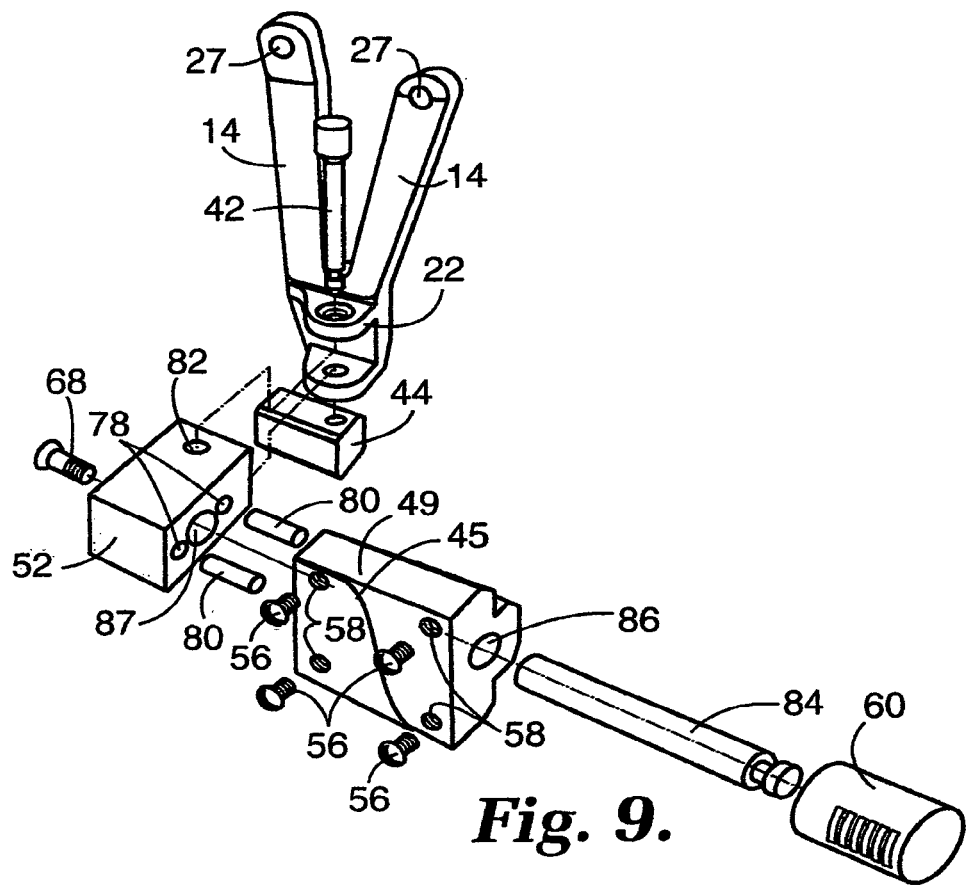

FIG. 9 is a further embodiment similar to that of FIG. 7 wherein alignment pins 80 are embedded into complimentary alignment openings 78 in mounting block 52 which, together with corresponding openings, not seen, in receiver 49, upon assembly, render the apparatus non-rotational about the cylindrical support shaft/locking pin 84, which slides through opening 86 in the receiver 49 and into opening 87 in block 52.

Figure 10:
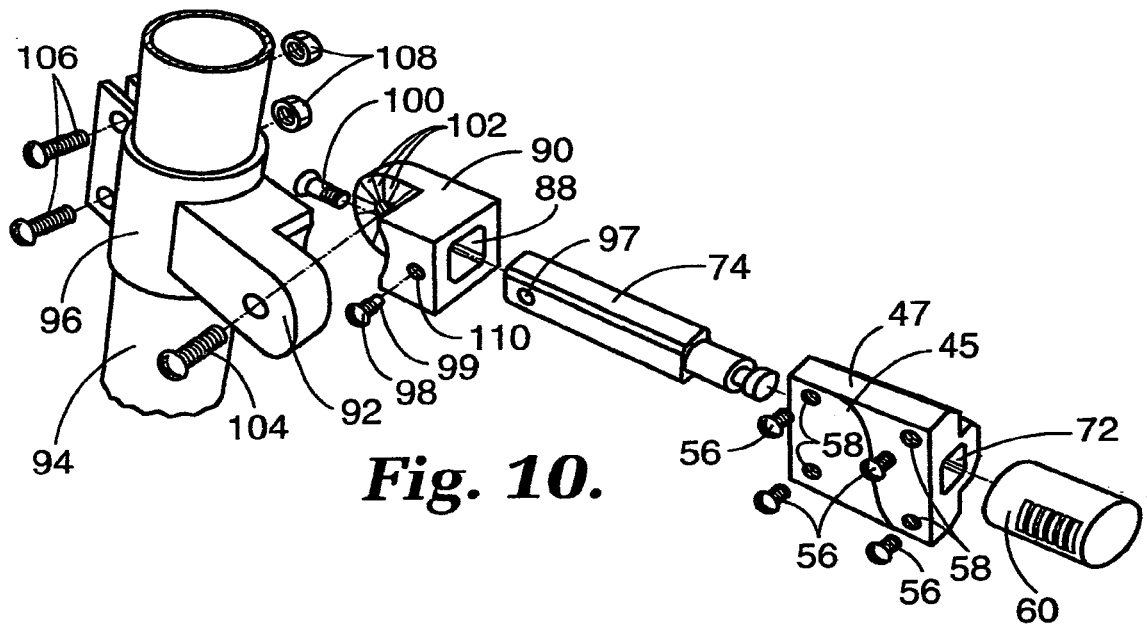
FIG. 10 depicts an exploded view of the storage container mounting apparatus of the invention, including a swivel joint attachable to a rigid strut of a vehicle such as a motorcycle, ATV, or bicycle, all according to the invention.

FIG. 10 shows a still further embodiment of the invention which may be affixed to any convenient strut on any vehicle of choice. Therein, the cantilevered support 74 is insertable at the proximal end into square opening 88 in the mounting block 90, and secured thereat by set screw 98, which is partially threaded as shown and partially smooth surfaced, indicated at 99. The screw 98 threadingly engages the threads in opening 110, the smooth end extending into opening 97 in the shaft 74, upon assembly, securing the apparatus thereat. The mounting block 90 forms one-half of a swivel joint with complimentary block 92, adjustable spatially by rotation and seating of grooves 102 and secured by tightening of threaded bolt 104. Shaft 74 is secured by threaded bolt 100. The entire assembly can be affixed, removably and lockably, as desired, to a strut 94 of a vehicle, by "C"-clamp 96 and bolts 106 and nuts 108.

Figure 11:
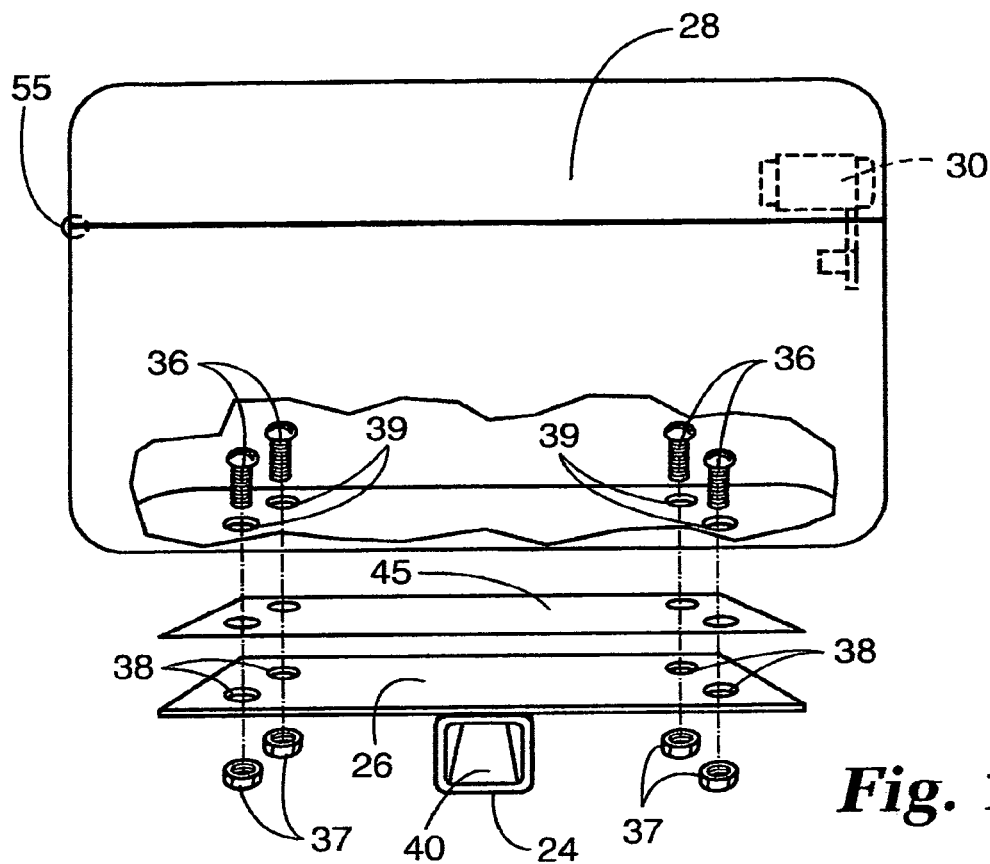
FIG. 11 shows a side elevational, exploded view, partially broken away, of a storage container mounted in a vertical orientation with respect to the mounting apparatus of the invention.
Figure 12:
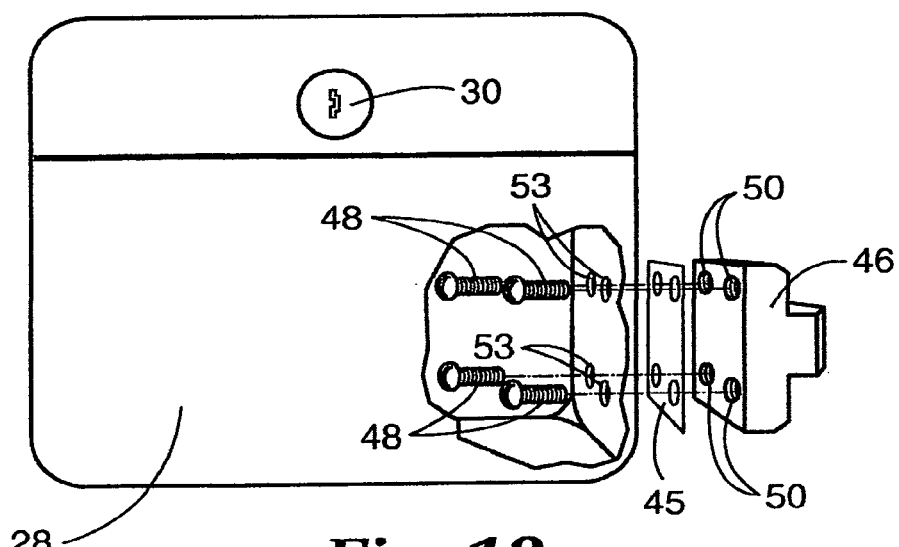
FIG. 12 shows a front elevational, exploded view, partially broken away, of a storage container mounted in a horizontal orientation with respect to the mounting apparatus of the invention.

FIG. 11 illustrates, in an exploded, side elevation, partially broken away, a storage container 28 having a lid lock 30 fore and a hinge 55 aft, removably securable to and resting on a receiving member comprising plate 26 affixed to square tube 24, described above, by nuts 37 and bolts 36, as shown, with optional adhesive film 45 shown for completeness. Film 45 may simply be a liquid epoxy applied to plate 28. FIG. 12 shows a front elevation, partially broken away, of a storage container 28 whose side wall is attachable to a unitary cantilevered support/receiver 46 by bolts 48 insertable into threaded openings 50 or, optionally, by adhesive 45.

The invention of this application has been described above both generically and with regard to specific embodiments. Although the invention has been set forth in what is believed to be the preferred embodiments, a wide variety of alternatives known to those of skill in the art can be selected within the generic disclosure. It will be clear to one skilled in the art that modifications or variations of such details can be made without deviating from the gist of this invention, and such modifications or variations are considered to be within the scope of the claims hereinbelow.

Having thus described the invention, what is claimed is:

1. A method of affixing a storage unit to a motorcycle having a frame including a foot peg bracket supporting a foot peg, and a primary seat supported on said frame, comprising the steps of: rendering said foot peg into a non-rotational configuration such that said foot peg is in a cantilevered orientation with a proximal end connected to said frame and a cantilevered distal end; supporting a receiving member on said foot peg; and connecting a storage device to said receiving member such that said storage device is positioned outboard and rearwardly of said primary seat.

2. The method of claim 1 wherein said foot peg is rendered non-rotational by the connection thereof to said receiving member, said storage device being supported from said frame by said foot peg.

3. The method of claim 2 wherein said receiving member includes a tubular sleeve and a mounting plate, said foot peg being received within said tubular sleeve and detachably secured thereto.

4. The method of claim 3 wherein said mounting plate of said receiving member is detachably connected to said tubular sleeve.

5. The method of claim 4 wherein said tubular sleeve is detachably locked to said support member by a removable locking device.

6. A method of mounting a cargo carrier on a motorcycle having a frame including a foot peg bracket mounting a foot peg, and a primary seat aligned with a forward direction of travel of said motorcycle, comprising the steps of: rendering said foot peg to be non-rotation and to serve as a support member extending from said frame in a cantilevered manner to establish a proximal end attached to said frame and a remote distal end; affixing a mounting plate to said support member at said distal end, said mounting plate having a generally planar vertical surface on which cargo can be secured for transport on said motorcycle and being positioned with respect to said direction of travel outwardly of and rearwardly from said primary seat; and mounting a storage container on said mounting plate such that said storage container is supported by said cantilevered support member from said frame, said storage container being positioned with respect to said direction of travel outwardly of and rearwardly from said primary seat.

7. The method of claim 6 wherein said mounting step includes the step of: connecting said storage container to said mounting plate by removable fasteners.

8. The method of claim 6 wherein said attaching step includes the steps of:
removing said foot peg from said foot peg bracket; and
securing said support member to said foot peg bracket.

9. The method of claim 8 wherein said support member is non-rotationally secured to said foot peg bracket.

10. The method of claim 9 wherein said support member extends from said foot peg bracket in an orientation parallel with said direction of travel, said surface of said mounting plate being vertical and aligned with said direction of travel of said motorcycle.

11. The method of claim 10 further comprising the step of:
retaining said storage container in said position outwardly of and rearwardly from said primary seat by positioning said mounting plate between said motorcycle frame and said storage container.

12. The method of claim 8 further comprising the step of mounting a storage container on said mounting plate such that said storage container is supported by said support member from said frame in a cantilevered manner, said storage container being positioned with respect to said direction of travel outwardly of and rearwardly from said primary seat.

13. The method of claim 12 further comprising the step of:
sliding a receiving member over said support member; and
securing said receiving member to said support member in a non-rotational manner, said mounting plate being connected to said receiving member.

14. The method of claim 13 further comprising the step of:
securing a locking device on said distal end of said support member to restrict removal of said storage container from said mounting plate.

* * * * *